(12) United States Patent
Pace et al.

(10) Patent No.: US 7,154,431 B2
(45) Date of Patent: Dec. 26, 2006

(54) SIGNAL SYNTHESIZER AND METHOD THEREFOR

(75) Inventors: Phillip E. Pace, Castroville, CA (US); Robert E. Surratt, White Plains, MD (US); Siew-Yam Yeo, Singapore (SG)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 170 days.

(21) Appl. No.: 10/794,543

(22) Filed: Mar. 1, 2004

(65) Prior Publication Data

US 2004/0201518 A1 Oct. 14, 2004

(51) Int. Cl.
G01S 7/38 (2006.01)
G06F 1/02 (2006.01)
H03B 21/00 (2006.01)
H03H 7/30 (2006.01)

(52) U.S. Cl. .......................... 342/15; 342/13; 342/14; 342/82; 342/89; 342/175; 342/195; 375/229; 375/316; 327/105; 327/106; 708/270; 708/271

(58) Field of Classification Search ............ 342/13–20, 342/175, 187, 194–197, 82–103; 327/105–107; 708/270–277; 710/72; 331/45; 365/192; 369/6, 61; 375/296, 229–236, 316
See application file for complete search history.

(56) References Cited

U.S. PATENT DOCUMENTS

| | | | | |
|---|---|---|---|---|
| 3,641,442 A | * | 2/1972 | Boucher ..................... | 327/105 |
| 3,659,207 A | * | 4/1972 | Perreault .................... | 327/107 |
| 3,781,706 A | * | 12/1973 | Osborne et al. ............ | 327/107 |
| 4,318,183 A | * | 3/1982 | Byington et al. ............ | 710/72 |
| 4,410,954 A | * | 10/1983 | Wheatley, III ............. | 327/105 |
| 4,636,734 A | * | 1/1987 | Genrich ..................... | 327/106 |
| 4,679,168 A | * | 7/1987 | Conway et al. ............ | 365/192 |
| 4,700,327 A | * | 10/1987 | Hilton .......................... | 369/6 |
| 4,736,389 A | * | 4/1988 | Debus et al. ............... | 375/296 |
| 4,799,189 A | * | 1/1989 | Grover ........................ | 369/61 |
| 4,891,646 A | * | 1/1990 | Wiegand .................... | 342/15 |
| 4,891,778 A | * | 1/1990 | Baseghi et al. ............ | 708/276 |
| 4,933,890 A | * | 6/1990 | Nuytkens et al. .......... | 708/276 |
| 5,016,259 A | * | 5/1991 | Hershberger ............... | 327/107 |
| 5,247,469 A | * | 9/1993 | McCune, Jr. ............... | 708/276 |
| 5,469,166 A | * | 11/1995 | Regev ........................ | 342/14 |
| 5,892,479 A | * | 4/1999 | Mills et al. ................ | 342/172 |
| 6,353,649 B1 | * | 3/2002 | Bockleman et al. ........ | 327/107 |

* cited by examiner

Primary Examiner—Bernarr E. Gregory
(74) Attorney, Agent, or Firm—John J. Karasek; Suresh Koshy

(57) ABSTRACT

A digital synthesizer includes a digital radio frequency memory (DRFM) for storing phase values and corresponding digital signals. The digital synthesizer includes a digital processing circuit receiving input from the DRFM, the circuit including tapped delay lines and a summer summing the output of the tapped delay lines. The digital synthesizer includes a signal modulator independently synthesizing within each tapped delay line a frequency modulated and gain scaled signal, wherein input to the tapped delay lines are phase values from the DRFM.

11 Claims, 2 Drawing Sheets

SIGNAL SYNTHESIZER AND METHOD THEREFOR

BACKGROUND OF THE INVENTION

Systems which coherently sum a series of tapped delay lines are relevant to a wide range of signal processing applications, transverse filtering being a prominent example. Another example is that of decoy repeaters. An object will modify any signal reflected from it according to the object's shape, and the object's velocity relative to the signal. This permits a hostile interrogator to identify the nature of such objects, which, if the objects are military platforms such as warships or aircraft, is not desirable. One solution has been to artificially synthesize fake characteristic echo signatures in response to receipt of an interrogating signal. Thus, for example, a series of decoy buoys deployed at sea could simulate the presence of a naval flotilla, and thereby potentially disrupt enemy plans.

FIG. 1 illustrates broadly how this is done for a ship 5 and an aircraft 3, in the line of sight of an interrogating signal 2. For illustrative purposes, signal 2 can be a radar pulse, but could as well be any linear signal pulse, of which sonar or acoustic signals are other examples. As signal 2 hits aircraft 3 and ship 5, it bounces off of their major reflective surfaces, which, for ship 5 are the hull 4, superstructure 6, and smokestack 8, and for the aircraft are the nose 9 and the wings 7. The echo from craft 3, 5 will be the superposition of the echoes from surfaces 4, 6, 8, and 9, 7, and because these surfaces are at different places along the line of sight of signal 2, the superimposed reflections will be out of phase with one another by the differing times of flight of signal 2 to each reflecting surface. This tends to lengthen the echo by an amount equal to the round trip time of flight of signal 2 between the nearest and farthest major reflector, in the case of ship 5 hull 4 and smoke stack 8, and to make the echo of varying magnitude as dictated by the varying radar cross sections of the reflecting surfaces. Furthermore, movement of aircraft 3 or ship 5 relative to signal 2 will Doppler shift the returned echos. Thus any platform which reflects signal will in effect frequency modulate signal 2, such that the returned echoes permit an interrogator to infer the nature and motion of the platform. The most common way to detect a Doppler shift is, responsive to a series of interrogation pulses, compare echoes from consecutive pulses. Thus, an imaging interrogator, such as a search radar, SAR, ISAR, etc., would infer Doppler by comparing consecutive echoes, and do so on a range bin by range bin basis. The interrogator can infer strength of reflection, e.g. radar cross-section, in a range bin from only one echo returned from the range bin by checking echo strength, although as a matter of prudence, it would likely check several such echoes to ensure that echo strength doesn't vary greatly.

Any credible repeater decoy must simulate the temporal lengthening and amplitude modulation caused by plural, recessed, reflective surfaces, and a simulate a realistic Doppler shift for each surface.

Conventionally this is done by analog systems which receive an interrogating signal and pass it through a length of cable having serial taps along its length, one tap per range bin (also called range cell, or downrange range cell). Each tap modulates the signal in amplitude and/or frequency to simulate reflection from the reflective surfaces within that range bin. Total path length of signals traversing the respective taps are selected to correspond to the differing times of flight of the interrogating signal to the respective range bins. Finally, the signals from the taps are summed, and the signal thus synthesized is retransmitted. In this manner, the system returns what appears to be an echo from an object located within the selected range bins, and having a signature indicative of the object to be simulated, e.g. a ship or aircraft in motion.

Unfortunately, analog systems have drawbacks which limit their usefulness as decoys. They are inherently noisy, and can hold an incoming signal only a short time for processing before the signal deteriorates below noise. This limits system bandwidth, and permits effective simulation of only small objects. Further, analog systems are costly and very bulky, the latter being a particular concern for military platforms, where space is extremely limited. Finally, analog systems cannot readily change operating parameters such as relative delays among taps, or the amount of modulation in the various taps. This means that analog repeaters cannot switch among different simulated objects on the fly, but rather must typically be fabricated for one specific target.

SUMMARY OF THE INVENTION

Accordingly, an object of the invention is to increase the bandwidth of tapped delay line processors of the kind above described.

Another object is to permit such delay line processors to hold received signals as long as necessary for a given application.

Another object is to increase the size of objects which such delay lines can simulate when used as repeater decoys.

Another object is to reduce the size and cost of such delay line processors.

In accordance with these and other objects made apparent hereinafter, the invention concerns a signal synthesizer which has a digital radio frequency memory (DRFM), and an associated digital processing circuit having a plurality of tapped delay lines, a summer disposed to sum the output of the delay lines, and signal modulator in each of the delay lines. A DRFM is a semiconductor device which can rapidly and permanently record digital information, most notably digitized samples of an incoming signal, and read it back equally rapidly when needed, as well as carry other circuitry. Because of this, the processing circuitry associated with the DRFM can be digital also, with its attendant values of speed, and hence greater bandwidth, reliability, small size, and modest cost. Because the DRFM can hold data indefinitely, the duration of the synthesized signal is not limited, as with analog systems, thus permitting (in the example of FIG. 1) simulation of larger objects by adding more taps to accommodate more range bins. Because the associated circuitry can be digital, and most especially because the circuitry can be dedicated to its processing task, rather than requiring extensive programming to perform its tasks, the speed of the synthesizer can be especially great. In a preferred embodiment, the associated circuitry is made part of the DRFM on the same monolithic chip in order to increase synthesizer speed even more. This is in contrast to a computer, or programmable processor, which, in conjunction with a fast and permanent memory like a DRFM, could in principle do the necessary processing. But the time needed to execute the large number of programming instructions necessary to process data makes this far less desirable than the invention, and, for the specific problem of decoy repeaters, largely ineffective.

Please note that, although the name DRFM suggests radio frequency signals, and thus suggests use in RF, radar, and other microwave applications, use of the term DRFM is not intended to limit the invention to these applications. Rather, the term DRFM has come to be associated with a specific class of device in the semiconductor art, and is here used only to denominate such devices, not suggest limitations on their uses.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 2:
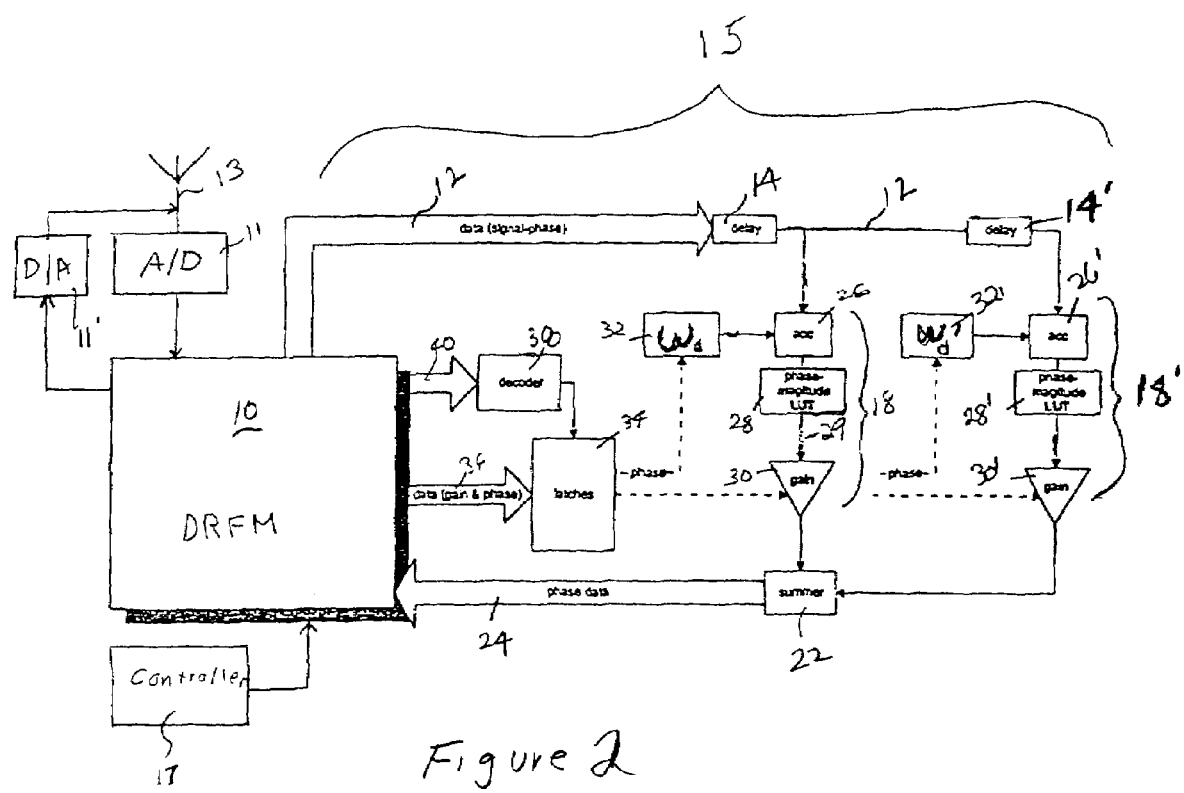
FIG. 2 is a circuit schematic diagram of an embodiment according to the invention.

With reference to the drawing figures, wherein like numbers indicate like parts throughout the several views, FIG. 2 shows an embodiment according to the invention. Member 13 is disposed to receive a signal, which, consistent with the non-limiting example of a radar system given above, is illustrated as an antenna, and which could be a radar pulse from a (possibly hostile) search radar. Analog to digital converter 11 digitizes the analog signal from member 13, producing a stream of digital samples which are stored in digital radio frequency memory (DRFM) 10, preferably in the form of phase samples. By phase sample, it is meant simply a digital representation of phase only. Phase data such as this does permit ultimate reconstruction of the original signal. See, T. T. Vu et al., *A GaAs Phase Digitizing and Summing System for Microwave Signal Storage*, IEEE JOURNAL OF SOLID STATE CIRCUITS, vol. 24, p. 104 (no. 1, February, 1989). Associated with DRFM 10 is digital circuitry 15 for processing the samples. The digitized samples are read in due course from DRFM 10 via delay line 12, having plural taps 18. Placement of delays 14, 14' as shown in FIG. 2 is per conventional usage, although they could as well be elsewhere, e.g. immediately before summer 22. The circuit of FIG. 2 shows two taps, 18 and 18', but this is illustrative and in principle one would have the number of taps which the particular application dictates: in the case of a repeater decoy, the number of major reflective surfaces of the simulated target.

The digital samples from DRFM 10 are sequentially read into taps 18, 18' by any conventional clocking scheme (not shown), the signals in the respective taps being delayed with respect to one another by preselected amounts dictated by delays 14, 14'. For simplicity, the following discussion references tap leg 18 only, at the expense of tap leg 18'; however, the function of each leg is identical. Signals in leg 18 pass through accumulator 26 having an associated look up table 28 of values of a sine and cosine for a $2\pi$ cycle, for use in constructing I & Q components, and through a selectable gain 30, which multiplies the signal in leg 18 by a preselected amount. Together, members 26, 28, 30 constitute a signal modulator for signals traversing leg 18 in the following manner.

Accumulator 26 frequency modulates the signal traversing tap leg 18 by phase rotation, which is a technique that is per se known, and is referred to as serrodyning, or serrodyne modulation. The phase $\phi$ of any signal subjected to a linear frequency modulation such as Doppler shift is given by $\phi=(\omega+\omega_d)t$, where $\omega$ is signal angular frequency, $\omega_d$ is the change in frequency due to the modulation, and t is time. Thus at each point in time the difference in phase between the modulated and unmodulated signal is $\omega_d t$. For a digitally sampled signal, the phase of the nth sample $\phi_n=n(\omega+\omega_d)\Delta t$, where n is an integer counter and $\Delta t$ is the period at which the signal is sampled. Here, the phase difference due to Doppler frequency is $n\omega_d\Delta t$. Thus one can shift the frequency of a digitally sampled signal by an amount $\omega_d$ by rotating each nth phase sample by $n\omega_d\Delta t$, which is to say incrementing the phase $n\omega\Delta t$ of each nth sample by $n\omega_d\Delta t$. Importantly, however, because Doppler is typically inferred by sampling echoes at the pulse repetition rate, and inspecting these samples for Doppler induced phase differences between the echoes, one can simulate a Doppler shift of $\omega_d$ simply by repeating the pulses from an interrogator, with each pulse phase shifted with respect to the next by an amount $\omega_d\Delta t$, where $\Delta t$ is here the pulse repetition interval.

In operation, member 32 sets nominal values of $\omega_d$ and $\omega_d'$ per instructions from DRFM 10. An interrogator sends a burst of N pulses having a pulse repetition period of $\Delta t$ (the same $\Delta t$ as above, for the reasons discussed below). Member 13 acquires each of the N pulses, converter 11 converts them to phase samples, and stores them in DRFM 10, which ultimately pipes them to data line 12. Tap leg 18 receives the phase samples from the first pulse, and accumulator 26 rotates the phase of each sample by an amount $\omega_d\Delta t$. The resultant phase samples are scaled by gain 30, and in the absence of output from leg 18', returns them to DRFM 10, and thereafter to converter 11' which reconstructs from the samples an analog pulse, which member 13 retransmits. The waveform of the retransmitted pulse is identical to that of the received pulse, save that it is phase rotated by $\omega_d\Delta t$. After processing this pulse, DRFM 10 changes the phase of member 32 to $2\omega_d\Delta t$, rotates each phase sample of the second pulse by $2\omega_d\Delta t$, and, again assuming no output from circuit 18', retransmits the reconstructed pulse. This continues through the N pulses of the burst, with the phase samples of each pulse rotated by an amount $n\omega_d\Delta t$, where n is pulse number, i.e. n=1, 2, . . . , N, and $\Delta t$ is the pulse repetition interval. In the absence of output from leg 18', the result is a stream of analog pulses from member 13, each of which is unchanged in shape and duration, but are different in phase from one pulse to the next by $\omega_d\Delta t$. An interrogator detecting these echoes would interpret the constant pulse to pulse phase shift of $\omega_d\Delta t$ as a Doppler shift from a single reflector. Tap leg 18' does the same thing, by use of a different $\omega_d$, and by the phase sample being delayed with respect to those passing through leg 18' by the difference in delays 14, 14'. Summer 22 then combines output of legs 18, 18'. The signal which summer 22 returns to DRFM 10 is the superposition of the signals exiting legs 18, 18'. This means that for each nth pulse of the N pulses, summer 22's output will be the superposition of two copies of the nth pulse, delayed with respect to one another by delay 14', scaled differently by gains 30, 30', and one phase rotated by $n\omega_d\Delta t$, the other by $n\omega'_d(\Delta t)$. An interrogator which receives the corresponding N analog pulses will interpret this as having come from two reflectors located in range bins separated by delay 14' with reflective cross sections respectively proportional to gains 30, 30'. Because the pulse to pulse phase difference between these pulses is $\omega_d\Delta t$ for the range bin corresponding to delay 14, and $\omega_d'(\Delta t)$ for the bin corresponding to 14', the interrogator will conclude that the reflectors in these two range bins produced Doppler shifts of $\omega_d$ and $\omega_d'$, respectively.

Leg 18 can, and preferably does, convert, via member 28, the phase rotated signal into separate inphase and quadrature (I & Q) components so as to be compatible with conventional microwave systems. This conversion of course can occur at any point between accumulator 26 and summer 22. This is conventionally done by constructing the I & Q components of the signal by using values of Cos ($\phi_n$) and Sin ($\phi_n$). Look up table 28 stores values of the cosine and sine functions for a complete cycle of $2\pi$ radians, and thus the magnitude of Cos($\phi_n$) and Sin($\phi_n$) can be had for any given phase $\phi_n$, and these are used to generate the I and Q outputs of leg 18. Although leg 18 could readily calculate Cos ($\phi_n$) and Sin ($\phi_n$), doing so is less computationally efficient than use of look up table 28, and thus would reduce overall system speed.

Figure 1:
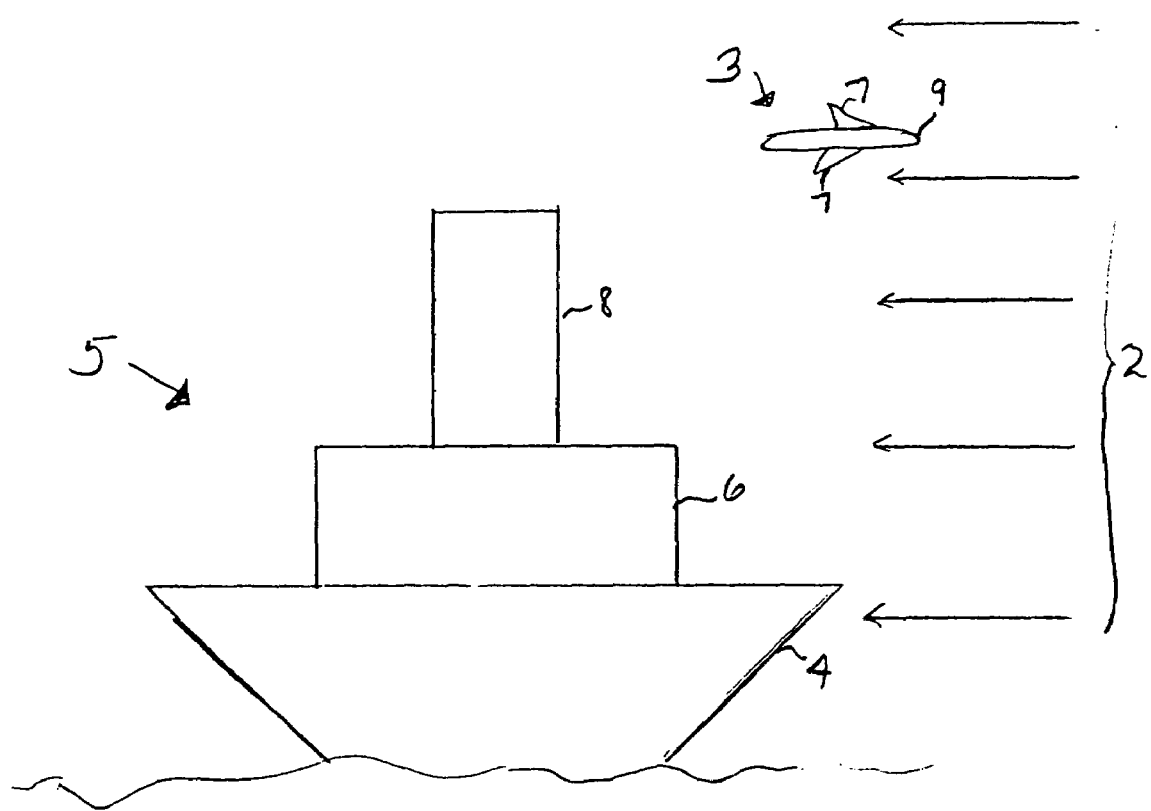
FIG. 1 is a schematic drawing illustrating a problem to which the invention is particularly useful.

Gain 30 scales the signal appropriately, e.g. for the examples of FIG. 1, scales the signal in proportion to the radar cross section of the reflective surfaces of aircraft 3 or ship 5 within the range bin to which leg 18 corresponds. Preferably, gains 30, 30' scale the signals in legs 18, 18' after the signals are converted to I and Q form. This greatly reduces the number of entries needed in lookup tables 28, 28'.

Thus for the examples of FIG. 1, the summed signal, returned by data line 24 to DRFM 10, has the shape and duration of a signal reflected from an object having major reflecting surfaces of radar cross sections proportional in size to gains 30, 30', and having relative speeds corresponding to Doppler shifts $\omega_d$ and $\omega_d'$. Of course, because the preferred output of each tap leg is in the form of inphase and quadrature components, summer 22 must sum the I's and Q's separately, as is well known to workers in this art. DRFM 10 would preferably forward the synthesized signal to digital to analog converter 11' to convert the synthesized signal to analog form, and to 13 for transmission of the signal. For convenience, and to further increase system speed, converter 11, 11' may be integral with DRFM 10.

Decoder 38 and latch 34 of circuit 15 update values of frequency shift and gain for the tap legs. Latch 34 receives from DRFM 10 via 36 new gain or $\omega_d$ values for tap legs 18, 18'. Decoder 38, responsive to DRFM 10 via 36, receives information about where and when to send the data in latch 34 (e.g. send a new value of $\omega_d'$ to member 32' at a given clock pulse) Controller 17 preferably directs the operation of members 34, 36, 38, 40 via DRFM 10, in order to forward system parameters from DRFM 10 through data lines 36, 40 to the tap legs, as above described. Controller 17 is preferably a process computer interfaced with DRFM 10, to permit an operator to change these parameters on the fly, in real time. Alternatively, controller 17 can do this automatically. This is particularly important if $\omega_d$ in any tap leg varies with time. In the example of FIG. 1, aircraft 3 flies directly at signal 2 at a constant speed, and would Doppler shift signal 2 by a constant, positive, amount. Ship 5, on the other hand, could be rocking back and forth in the water along the line of sight of signal 2, and thus the Doppler shift corresponding to this motion would oscillate in time.

The invention has been described in what is considered to be the most practical and preferred embodiments. It is recognized, however, that obvious modifications to these embodiments may occur to those with skill in this art.

Accordingly, the scope of the invention is to be discerned from reference to the appended claims wherein:

1. A digital synthesizer, comprising:
   a digital radio frequency memory (DRFM) for storing phase values and corresponding digital signals;
   a digital processing circuit receiving input from said DRFM, said circuit comprising a plural of tapped delay lines, and a summer summing the output of said delay lines; and
   a signal modulator independently synthesizing within each tapped delay line a frequency modulated and gain scaled signal, wherein input to said tapped delay lines are phase values from said DRFM.

2. The synthesizer of claim 1, wherein said DRFM records the phase of digital samples of an analog signal, said phases being in the form of a series of digital phase samples, each of said phase samples corresponding to the phase of a corresponding one of said digital samples of said analog signals;
   input said phase samples into said circuit effective to cause said phase samples to traverse said each of said plurality of delay lines, and
   wherein said selected frequency modulation is imposed by rotating the phase of each of said phase samples by a preselected amount, said rotating being by adding said preselected amount to said each of said phase samples.

3. The synthesizer of claim 1, wherein the signal in each of said tapped delay lines is converted to inphase and quadrature components by use of a look up table.

4. The synthesizer of claim 1, further comprising a controller controlling resetting of both (a) a delay time between said each of said plurality of delay lines, and (b) a preselected amount of phase rotating.

5. The synthesizer of claim 4, wherein said controller is a digital computer.

6. A method of synthesizing signals comprising:
   receiving digital samples of an analog signal produced by a physical object; storing said digital samples together with phase values corresponding to said samples in a digital radio frequency memory (DRFM);
   reading said phase values into a digital processing circuit; said circuit comprising a plurality of tapped delay lines, and a summer summing the output of said delay lines, wherein each tapped delay line comprises a signal modulator and wherein said reading causes said samples to traverse each said tapped delay to cause said summer to add the output of each of said delay lines; and
   imposing a frequency modulated and gain scaled on a signal traversing each of said plurality of delay lines, the amount of frequency modulation and gain scaling being preselected independent of the amount of frequency modulation and gain scaling in each other delay line; and synthesizing a desired signal by using said modulated phase values from said DRFM.

7. The method of claim 6, wherein said DRFM records the phases of digital samples of an analog signal, said phases being in the form of a series of digital phase samples, each of said phase samples corresponding to the phase of a corresponding one of said digital samples of said analog signals;
   inputs said phase samples into said circuit effective to cause said phase samples to traverse said each of said plurality of delay lines, and
   wherein said selected frequency modulation is imposed by rotating the phase of each of said phase samples by a preselected amount, said rotating being by adding said preselected amount to said each phase samples.

8. The method of claim 7, further comprising:
resetting of both (a) the delay time between said each of said plurality of delay lines, and (b) said preselected amount of phase rotating.

9. The method of claim 8, further comprising using a digital computer to effect said resetting.

10. The method of claim 6, wherein the signal in each of said tapped delay lines is converted to inphase and quadrature components by use of a look up table.

11. The method of claim 6, further comprising embodying said digital processing circuit in a single monolithic semiconductor.

* * * * *